(12) United States Patent
Tsubaki (10) Patent No.: US 7,042,738 B2
(45) Date of Patent: May 9, 2006

(54) POWER-SUPPLY WIRING DEVICE AND HARNESS LAYOUT STRUCTURE BY THE POWER-SUPPLY WIRING DEVICE

(75) Inventor: Akira Tsubaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 293 days.

(21) Appl. No.: 10/616,354

(22) Filed: Jul. 10, 2003

(65) Prior Publication Data

US 2004/0017648 A1    Jan. 29, 2004

(30) Foreign Application Priority Data

| Jul. 25, 2002 | (JP) | ............................ 2002-216162 |
| Jul. 25, 2002 | (JP) | ............................ 2002-216163 |
| Nov. 13, 2002 | (JP) | ............................ 2002-329462 |

(51) Int. Cl.
  *H02B 1/20* (2006.01)
(52) U.S. Cl. .................. 361/826; 174/72 C; 174/72 A
(58) Field of Classification Search ................ 361/826, 361/601, 827, 828; 174/72 A, 72 C, 72 R, 174/70 R, 71 R
See application file for complete search history.

(56) References Cited

U.S. PATENT DOCUMENTS

| 3,909,047 | A | * | 9/1975 | Salmela ...................... 285/119 |
| 6,070,931 | A | | 6/2000 | Yamaguchi et al. ..... 296/146.7 |
| 6,176,715 | B1 | * | 1/2001 | Buescher .................... 439/162 |
| 6,492,592 | B1 | * | 12/2002 | Murofushi et al. ....... 174/72 A |
| 6,494,523 | B1 | * | 12/2002 | Kobayashi .................. 296/155 |
| 6,575,760 | B1 | * | 6/2003 | Doshita et al. .............. 439/34 |
| 6,685,253 | B1 | | 2/2004 | Wolcott |
| 6,724,613 | B1 | * | 4/2004 | Doshita et al. ............. 361/679 |
| 6,818,827 | B1 | * | 11/2004 | Kato et al. ................. 174/72 A |
| 2002/0005014 | A1 | | 1/2002 | Doshita et al. ............... 49/360 |

FOREIGN PATENT DOCUMENTS

| DE | 10118205 A1 | 10/2001 |
| EP | 100 00 930 | 7/2000 |
| JP | 2000-264136 | 9/2000 |
| JP | 2001-354085 | 12/2001 |
| JP | 2002-002288 | 1/2002 |
| JP | 2002-2288 | 1/2002 |

* cited by examiner

*Primary Examiner*—Kamand Cuneo
*Assistant Examiner*—Ivan Carpio
(74) *Attorney, Agent, or Firm*—Armstrong, Kratz, Quintos, Hanson & Brooks, LLP (57) ABSTRACT

A power-supply wiring device, which protects electric wires between a sliding and fixed structures, and absorbs wire length change by sliding motion of the sliding structure, and a harness layout structure with the power-supply wiring device are provided. The power-supply wiring device includes a first case 5 for receiving a wire harness 4 folded into a U-shape, a moving portion 7, a harness holding member 8 disposed rotatably at the moving portion 7, a second case 44 receiving the harness holding member 8 freely to be swung. In the harness layout structure, the first case 5 and the second case 44 are mounted respectively on the sliding structure and the fixed structure, and the harness holding member 8 connects between the fixed and sliding structures.

10 Claims, 7 Drawing Sheets

# POWER-SUPPLY WIRING DEVICE AND HARNESS LAYOUT STRUCTURE BY THE POWER-SUPPLY WIRING DEVICE

BACKGROUND OF THE INVENTION

1. Field of the Invention

This invention relates to a power-supply wiring device, for example disposed in a sliding door of a car, to supply electric power continuously from a vehicle body to the sliding door with absorbing change of wire length between the sliding door and the vehicle body by a stroke to open and close the sliding door, and a harness layout structure by using the power-supply wiring device.

2. Description of the Related Art

Usually, to supply electric power from a vehicle body of a car to car electric devices or auxiliary devices in a sliding door, power-supply wiring device which pulls and pushes a wire harness in a case (harness protector) correspondingly to open/close motion of the sliding door. The case is mounted vertically in the sliding door, and the wire harness (electric wires covered by a protection tube of synthetic resin) is received with curvature in the case and pushed upwardly. One end of the wire harness is disposed at the vehicle body and the other end of the wire harness is disposed at the sliding door (refer the Japan Patent Application 1). When the sliding door is opened from complete closed condition, the sliding door is separated outwardly from the vehicle body and slid two-dimensionally.

Japan Patent Application reference 2 discloses a power-supply wiring device which absorbs change of wire length between the sliding door and the vehicle body corresponding to opening and closing the sliding door by disposing a box-shape case horizontally on the vehicle body and receiving the wire harness (electric wires) spirally in the case.

A power-supply wiring device which disposes electric wires along a convexly formed steel band having directional bending stiffness or a flexible cover having caterpillar shape or the like is proposed. A power-supply wiring device which uses a special electric wire such as a cabtyre cable, a curl electric cord or braided wire is proposed.

References are follows;

Reference 1: Japan Patent Application Laid open 2001-354085, page 7–9, FIGS. 4–7;

Reference 2: Japan Patent Application Laid open 2002-2288, page 2–4, FIG. 1.

3. Objects to be Solved

However, the aforesaid usual power-supply wiring devices are limited not to place the case at a position interfering with a window glass, a mechanism for moving the window glass up-and-down or electric devices in the sliding door. When the sliding door is opened from complete closed condition, the sliding door is separated outwardly from the vehicle body and slid two-dimensionally, so that motion of the wire harness is complicated and the manufacturing cost may be increased by requiring a suitable flexible wire harness. The power-supply wiring devices are required to use a leaf spring having high durability of bending, or an expensive electric wire cover having directional bending stiffness, so that the structure of the power-supply wiring device is complicated and the manufacturing cost is increased. The wire harness is exposed between the sliding door and the vehicle body so that the wire harness may be deformed by interfering with outside objects or soiled easily. The power-supply wiring device by receiving the wire harness spirally in the case is limited to use a flexible electric wire. The power-supply wiring device by using a special electric wire such as a cabtyre cable or a curl electric cord has a difficulty of changing an electric circuit correspondingly to each car models by limitation of a number of electric wires or wire diameter, and the manufacturing cost may be increased. The power-supply wiring device by receiving electric wires spirally in a horizontal case may require the horizontal case having larger height so that it may be difficult to install the power-supply wiring device at a small room of the vehicle body.

To overcome the above drawback, an object of this invention is to provide a power-supply wiring device for supplying electric power continuously from a fixed structure such as a vehicle body to a sliding structure such as a sliding door with absorbing change of wire length between the sliding structure and the fixed structure by elongating or shortening the electric wire by sliding motion of the sliding structure, which can give two-dimensional smooth sliding motion of opening and closing the sliding structure, and can reduce an installing space of a height of at the sliding structure and the fixed structure, and can simplify structure of the power-supply wiring device without a pushing member such as a leaf spring, and can prevent the wire harness from interference with outside objects, and can correspond to various circuits at a low cost with a normal insulation covered wire, not a special wire, and a harness layout structure by using the power-supply wiring device.

SUMMARY OF THE INVENTION

How to Attain the Object

In order to attain the object, a power-supply wiring device according to the present invention includes a first case capable to receive a wire harness folded into a U-shape, a moving portion movable freely along said first case, and a harness holding member mounted on said moving portion for holding said wire harness and leading said wire harness out of said first case.

According to the power-supply wiring device mentioned above, when the first case is mounted vertically on the sliding structure such as a sliding door, the harness holding member projects from the first case toward the fixed structure such as the vehicle body to connect the moving portion and the fixed structure. The wire harness is wired from the sliding structure through the first case and the harness holding member toward the fixed structure. The wire harness folded like a U-shape is disposed in the first case. When the moving portion is moved along the first case correspondingly to the motion of the sliding structure, the wire harness is formed from a U-shape to a J-shape or a quadratic curve so as to absorb wire length change by a slide stroke of the sliding structure. The harness holding member is moved together with the moving portion along a sliding direction. The harness holding member holds the wire harness without droop between the sliding structure and the fixed structure to prevent the wire harness from interference with the outside objects.

The power-supply wiring device according to the present invention is further specified by that a first guide portion for sliding freely said moving portion to be engaged with said first guide portion is disposed along lengthwise of said first case.

According to the power-supply wiring device mentioned above, the moving portion can slide smoothly along the first guide portion of the first case so that the wire harness is formed smoothly from a U-shape to a J-shape or a quadratic curve so as to absorb wire length change by a slide stroke of the sliding structure.

The power-supply wiring device according to the present invention is further specified by that said harness holding member is engaged rotatably around one end thereof with a shaft of said moving portion, and the power-supply wiring device further includes a second case receiving said harness holding member to be moved inwardly and outwardly for supporting said wire harness led out of the other end of said harness holding member freely to swing said wire harness.

According to the power-supply wiring device mentioned above, the harness holding member is moved together with the moving portion along a sliding direction and swung around the shaft. The harness holding member holds the wire harness without droop between the sliding structure and the fixed structure to prevent the wire harness from interference with the outside objects. When the sliding structure such as a sliding door is separated outwardly from the fixed structure such as a vehicle body and slid for opening completely, the harness holding member is drawn from the second case. When the sliding structure is slid and moved near to the fixed structure for closing completely, the harness holding member is pushed into the second case. Thus, sliding motion of the moving portion in the first case, rotating motion of the harness holding member and swing motion of the wire harness together with the harness holding member in the second case can absorb smoothly wire length change by two-dimensional motion of the sliding structure. The wire harness is wired by substantially straight shape in the second case so that the wire harness is not stacked by itself and the second case is miniaturized in the height. Furthermore, the wire harness is not wired spirally in the second case so that each electric wire used for the wire harness need not be so flexible and expensive special wires are not required.

The power-supply wiring device according to the present invention is further specified by that said second case is provided with a second guide portion for sliding said harness holding member.

According to the power-supply wiring device mentioned above, the harness holding member is moved smoothly to be positioned accurately along the second guide portion. Thereby, forces for drawing and pushing the harness holding member are reduced and the sliding structure can be slid more easily so that the second case and the harness holding member are prevented from wearing and absorbing corresponding to sliding motion is performed securely.

The power-supply wiring device according to the present invention is further specified by that said harness holding member is moved along a circular arc inwardly and outwardly in said second case.

According to the power-supply wiring device mentioned above, when the sliding structure is separated outwardly from the fixed structure and slid for opening completely, the harness holding member is drawn along the circular arc from the second case, and when the sliding structure is slid and moved near to the fixed structure for closing completely, the harness holding member is pushed along the circular arc into the second case. Thereby, wire length change by two-dimensional motion of the sliding structure can absorb more smoothly, and the wire harness led out of the other end of the harness holding member is swung smoothly without droop.

The power-supply wiring device according to the present invention is further specified by that said harness holding member is formed into a circular arc shape.

According to the power-supply wiring device mentioned above, sliding tracks of the harness holding member corresponds to the shape of the harness holding member so that the harness holding member is more smoothly moved back and forth accurately along the circular arc in the second case. Thereby, the wire harness led out of the other end of the harness holding member is swung more smoothly without droop accurately along the circular arc.

The power-supply wiring device according to the present invention is further specified by that said harness holding member is provided with a space for passing said wire harness therethrough.

According to the power-supply wiring device mentioned above, the wire harness between the sliding structure and the fixed structure is received in the harness holding member so that the wire harness is protected securely from interference with outside objects or rainwater.

The power-supply wiring device according to the present invention is further specified by that a connector at an end of the wire harness is fixed on the second case.

According to the power-supply wiring device mentioned above, the connector of the wire harness is fixed on the second case so that a connector of a mating wire harness can be connected with the connector of the second case and operation of connecting is improved. Furthermore, the wire harness is swung around the connector in the second case so that no harness supporting member is required.

A harness layout structure by the power-supply wiring device according to the present invention is specified by that the first case of the power-supply wiring device is mounted on a sliding structure and the second case of the power-supply wiring device is mounted on a fixed structure engaging with the sliding structure freely to slide to each other, and the harness holding member is disposed rotatably and slidably at said sliding structure, and the wire harness is wired from the sliding structure through the harness holding member into the second case on the fixed structure.

According to the harness layout structure mentioned above, the harness holding member is moved together with the moving portion along a sliding direction and swung around the shaft. The harness holding member holds the wire harness without droop between the sliding structure and the fixed structure to prevent the wire harness from interference with the outside objects. When the sliding structure such as a sliding door is separated outwardly from the fixed structure such as a vehicle body and slid for opening completely, the harness holding member is drawn from the second case. When the sliding structure is slid and moved near to the fixed structure for closing completely, the harness holding member is pushed into the second case. Thus, sliding motion of the moving portion in the first case, rotating motion of the harness holding member and swing motion of the wire harness together with the harness holding member in the second case can absorb smoothly wire length change by two-dimensional motion of the sliding structure. The wire harness is wired by substantially straight shape in the second case so that the wire harness is not stacked by itself and the second case is miniaturized in the height. Furthermore, the wire harness is not wired spirally in the second case so that each electric wire used for the wire harness need not be so flexible and expensive special wires are not required.

A harness layout structure according to the present invention is further specified by that said sliding structure is disposed vertically, and said fixed structure and harness holding member are disposed horizontally.

According to the harness layout structure mentioned above, the harness holding member holds the wire harness without droop between the sliding structure and the fixed structure, while the sliding structure is opened and closed.

The second case is miniaturized in the height so as to be disposed horizontally in the fixed structure.

The above and other objects and features of this invention will become more apparent from the following description taken in conjunction with the accompanying drawings.

DESCRIPTION OF THE PREFERRED EMBODIMENT

FIGS. 1–9 show each embodiment of a power-supply wiring device at a sliding door and harness layout structure with the power-supply wiring device according to the present invention.

Figure 1:
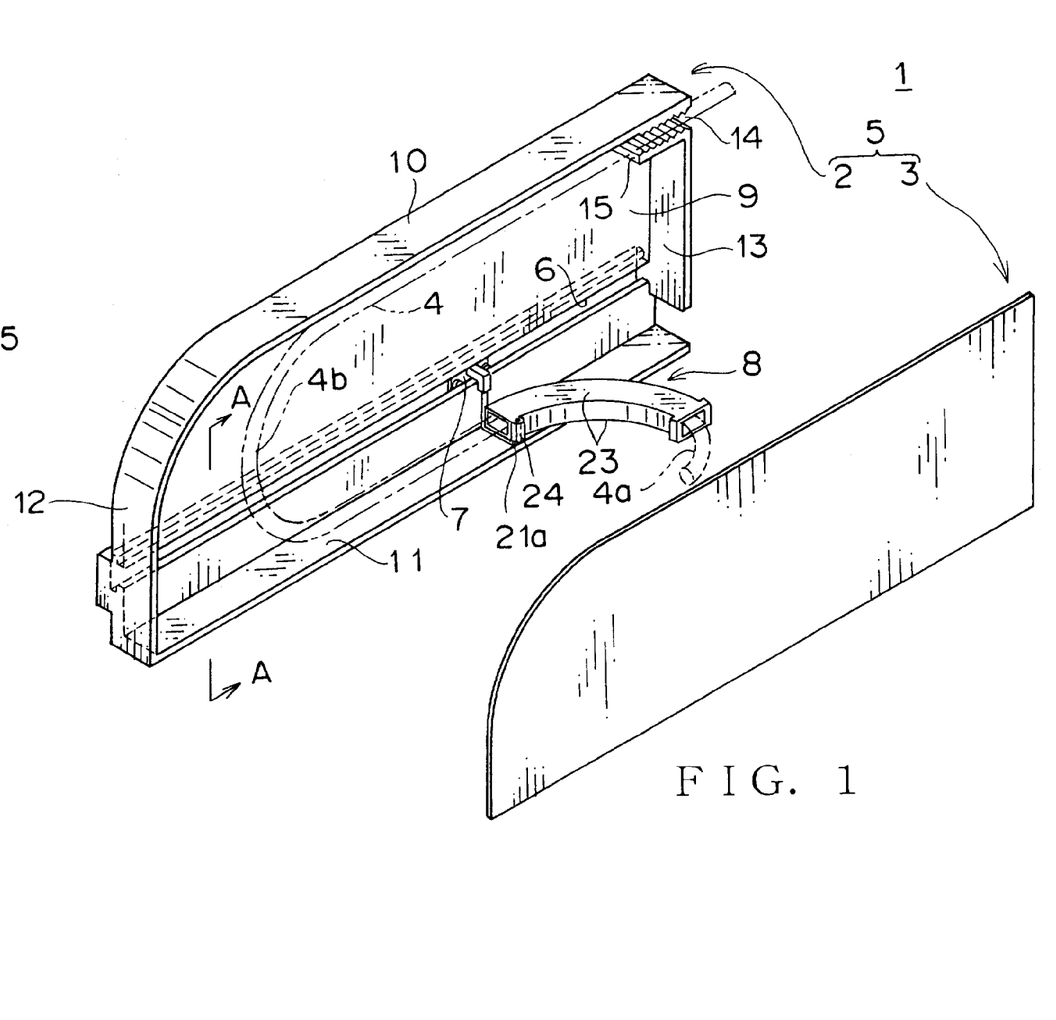
FIG. 1 is an exploded perspective view of one embodiment of a power-supply wiring device at a sliding structure according to the present invention.

FIG. 1 shows the embodiment of the power-supply wiring device. The power-supply wiring device 1 includes a first case provided with a box-shape base portion 2 and a plate-shape cover 3 for receiving a wire harness 4 folded in a U-shape, a slider 7 (moving portion) engaging with a guide rail 6 (guide portion) of the base portion 2 freely to be slid to each other and a rectangular tubed harness holding member 8 supported by the slider 7 freely to be rotated for receiving a part of the wire harness 4a led from the first case 5.

The base portion 2 of the first case 5 has a vertical base plate 9, a surrounding wall having walls 10–13 perpendicular to the base plate 9 at top, bottom, right and left edges of the base plate 9, the horizontal guide rail 6 formed integrally with the base plate 9. The cover 3 is fixed on the base portion 2 by not-shown locking means such as a lock projection and a flexible engaging portion.

An opening 14 for leading a harness is formed between the top wall 10 and one side-wall 13 of the base portion 2. The one side wall 13 has a fixing portion 15 bent inwardly and horizontally at the top of the one side wall 13 for fixing the wire harness 4. The first case 5 is mounted in the sliding door. A flexible protection tube such as a corrugated tube covering the wire harness 4 is fixed at the fixing portion 15. The wire harness 4 is wired horizontally along the top wall 10 and folded in a U-shape at the other side wall 12 and extended along the harness holding member 8 at the guide rail 6 toward a vehicle body. The other side wall may be vertical, but in this embodiment the half top area of the other side wall 12 is curved along a curved portion 4b of the wire harness 4 for minimizing a space. The bottom wall 11 of the first case 5 performs as a harness support wail for preventing droop of the wire harness 4 when the slider is located at the one side wall 13.

Figure 2:
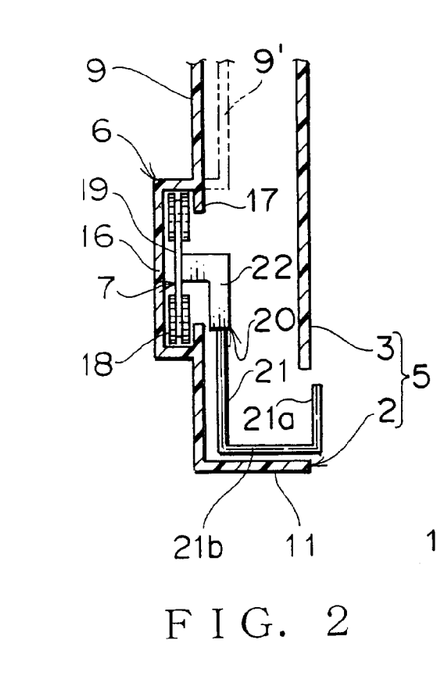
FIG. 2 is a sectional view taking along the line A—A in FIG. 1.

The guide rail 6 is disposed horizontally in parallel along the bottom wall 11 so as to extend from the one side wall 13 to the other side wall 12 of the first case 5. As shown in FIG. 2 (sectional view taking along line A—A in FIG. 1), the guide rail 6 is formed by providing a concave portion 16 on the base portion 9 of the first case 5 and disposing a pair of ribs 17 projecting respectively from a top edge and a bottom edge of the concave portion 16. Rollers 18 of the slider 7 are engaged with the concave portion 16 freely to slide therein. The rollers 18 are supported rotatably by a base plate 19 from which a hook portion 20 projects. The harness holding member 8 (FIG. 1) is connected rotatably with a vertical shaft 21a disposed upwardly at a free end of the hook portion 20.

The hook portion 20 has a large-diameter support portion 22 continuous to the base plate 19 and perpendicularly bent downwardly, and a small-diameter hook 21 extending downwardly from the support portion 22. The hook 21 has the shaft 21a at the free end of the hood 21 and a horizontal portion 21b perpendicular to the shaft 21a. The horizontal portion 21b traverses under the harness holding member 8 with a gap to stabilize attitude of the harness holding member 8 (see FIG. 5). In FIG. 2, a chain line 9' shows an embodiment which disposes the base plate closer to the cover 3 for preventing interference of the support portion 22 of the hook portion 20 and the wire harness (FIG. 1).

In FIG. 1, the harness holding member 8 is curved circularly and protector-like having rectangular cross-sectional tube-shape which top, bottom, right and left are covered by a wall portion 23. The harness holding member 8 has a bearing portion 24, including a vertical hole to be inserted from bottom thereof by the shaft 21a (FIG. 2), at a base end of a wall of a smaller radius side of the wall portion 23. The harness holding member 8 is disposed under the guide rail 6 along the bottom wall 11 of the first case 5 freely to move horizontally and swing around the shaft 21a. The first case 5 performs a main protector for the wire harness, and the harness holding member 8 performs a sub-protector for the wire harness. The harness holding member 8 is made of a synthetic resin to have high stiffness so as to protect securely the wire harness therein.

Figures 3, 4:
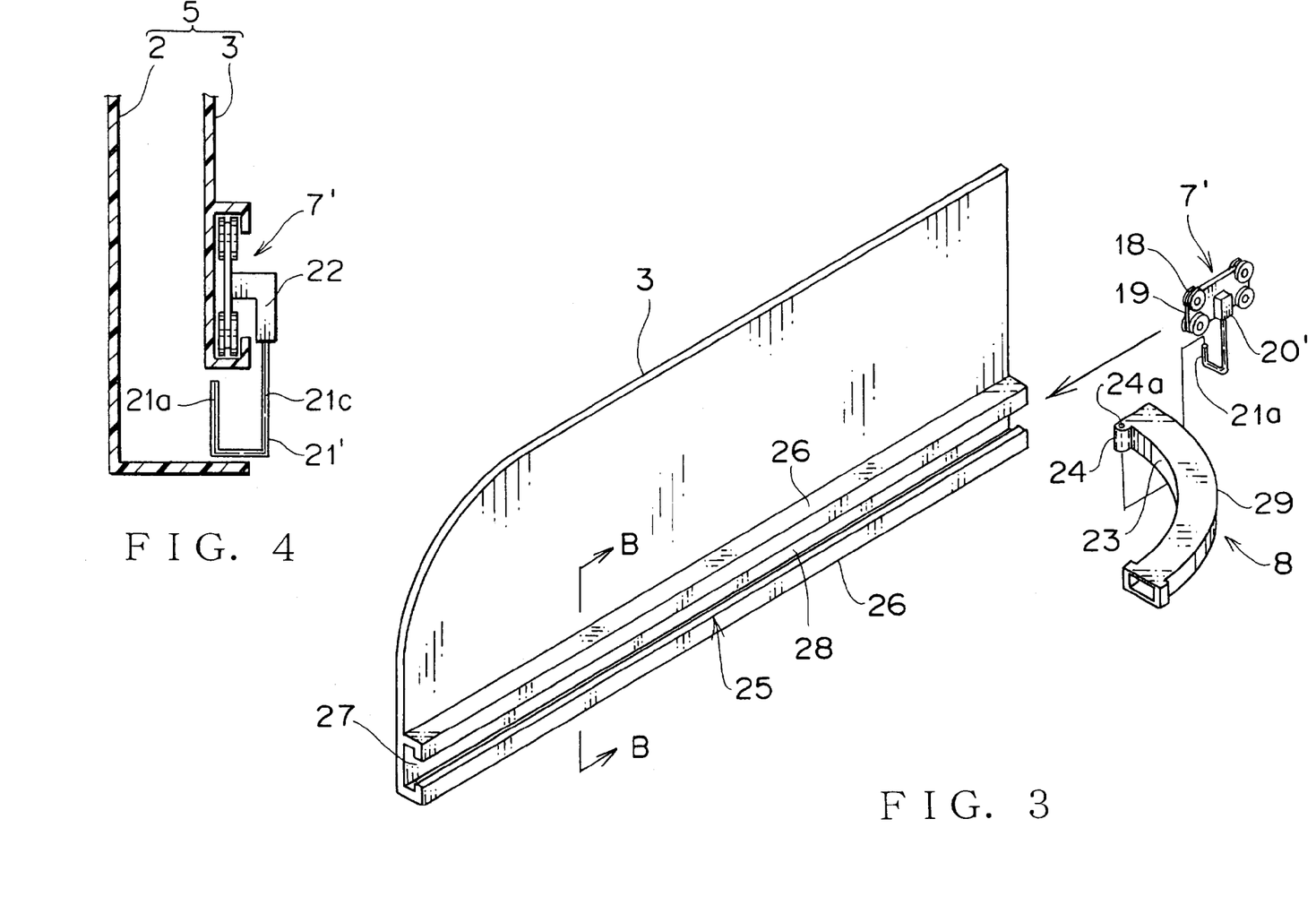
FIG. 3 is an exploded perspective view of the other embodiment of a power-supply wiring device at a sliding structure in which location of a guide rail is changed.
FIG. 4 is a sectional view taking along the line B—B in FIG. 3.

FIGS. 3 and 4 show an embodiment of the power-supply wiring device which has the guide rail 25 disposed at the cover 3 not at the base portion 2 of the first case 5.

As shown in FIG. 3, the guide rail 25 extends horizontally the full length of the cover 3 at a lower area on an outer surface of the cover 3. The guide rail 25 is formed with a pair of wall portions 26 having an L-shape cross-section and facing to each other. A space 27 for receiving the slider 7' freely to be slid is formed between the pair of wall portions 26. The hook 20' of the slider 7' is led from a opening 28 having a horizontal slit shape continuous to the space 27.

The slider 7' is formed, similarly as the slider 7 of the embodiment in FIG. 2, with a plurality of rotatable rollers 18, a base plate 19 supporting the rollers 18 and a hook portion 20' continuous to the base plate 19. The hook portion 20' includes a support portion 22 at upper area thereof and a hook 21' at bottom area thereof, as shown in FIG. 4 (sectional view taking along B—B in FIG. 3). Differently from the embodiment in FIG. 2, the hook 21' is faced inside of the first case 5. A vertical portion 21c continuous to the support portion 22 is disposed at outside of the first case 5 and a vertical upward shaft 21a connected by a short horizontal portion with the vertical portion 21c is disposed at inside of the first case 5. The harness holding member 8 is engaged with the shaft 21a freely to be rotated.

The harness holding member 8 is the same structure as that in the embodiment in FIG. 1. The harness holding member 8 has a main body 29 curved circularly and having rectangular cross-sectional tube-shape and a bearing portion 24, including a hole 24a for inserting the shaft 21a at a base end of a wall of a smaller radius side of the wall portion 23.

Figures 5, 6, 7:
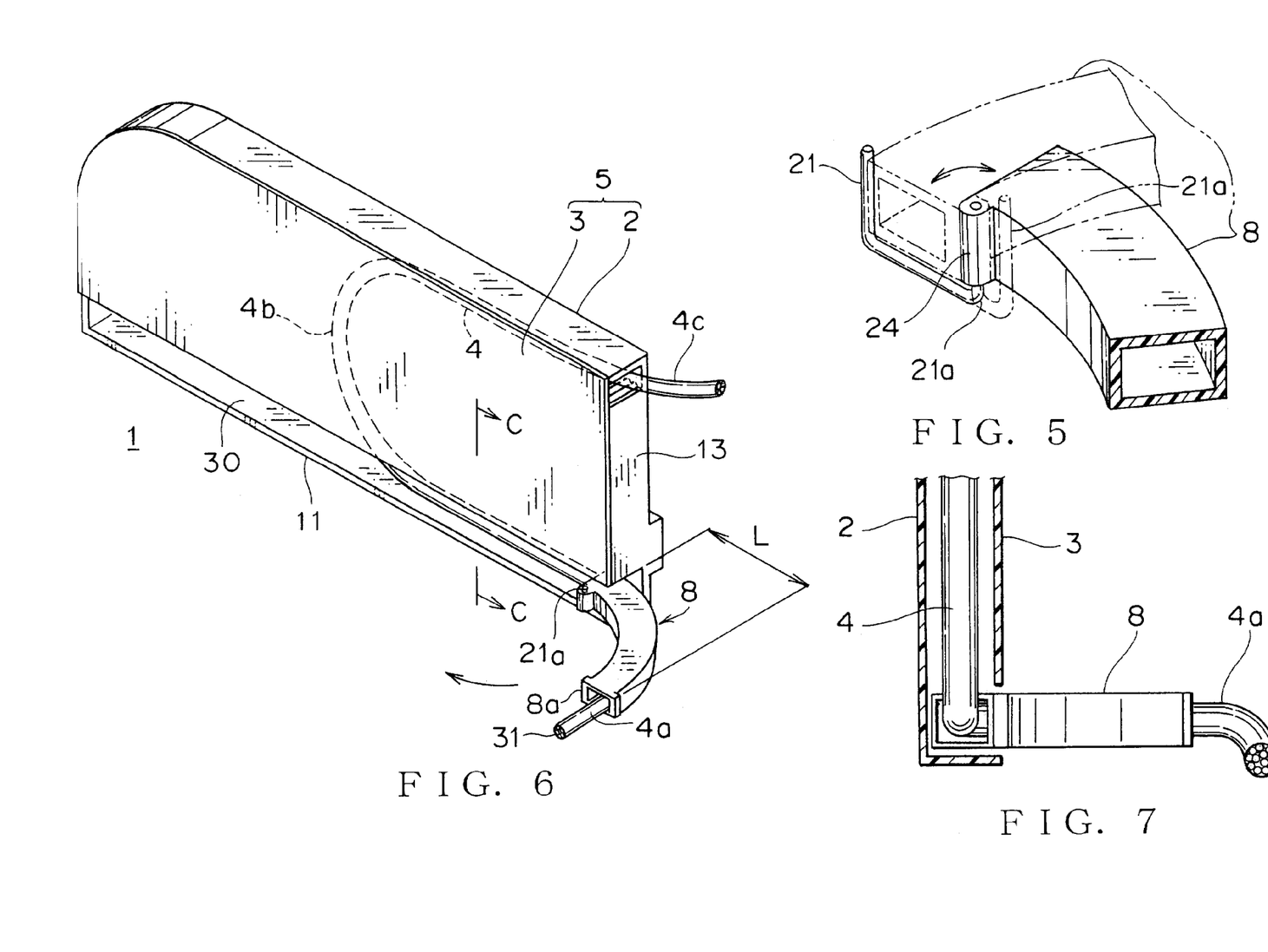
FIG. 5 is a perspective view, showing connection of a harness holding member and a shaft.
FIG. 6 is a perspective view of the power-supply wiring device in which the harness holding member is slid to one side.
FIG. 7 is a sectional view taking along the line C—C in FIG. 6.

FIG. 5 shows that the bearing portion 24 of the harness holding member 8 is engaged freely to be rotated with the hook 21 of the embodiment in FIG. 2 (shown by solid lines) and the hook 21' of the embodiment in FIG. 4 (shown by chain lines). The harness holding member 8 moves around the shaft 21a, i.e. swings along motion of the slider 7 (FIG. 1).

FIG. 6 shows that the wire harness 4 folded into U-shape is received in the base portion 2 of the first case 5 and the wire harness 4 is inserted through the harness holding member 8 and the first case 5 is closed with the cover 3. The cover 3 has a slightly lower height than that of the base portion 2 so as to form a horizontal slit-shape opening 30 between the bottom wall 11 of the base portion 2 and a bottom edge of the cover 3 at a bottom portion of the first case 5. The harness holding member 8 can move freely in the opening 30.

The wire harness 4 in the first case 5 is formed with a plurality of electric wires covered by a protecting tube. A wire harness 4a in the harness holding member is formed with a plurality of electric wires 31 without a protecting tube. Each electric wire is a low-cost insulation-covered electric wire.

The first case 5 shown in FIG. 6 is disposed vertically and fixed in a left sliding door (sliding structure) of a vehicle. A harness portion 4c led from a side-upper area of the first case 5 is wired in the sliding door to be connected with an electric device or an auxiliary device in the sliding door. The wire harness portion 4a led through the harness holding member 8, as shown in FIG. 7 (sectional view taking along line C—C in FIG. 6), is wired toward a vehicle body (fixed structure) to be connected with an electric power source or the like.

FIG. 6 shows the opened sliding door (the sliding door slidingly moved to rearward of the vehicle. The harness holding member 8 is located together with the slider 7 (FIG. 1) at front-end side of the first case 5 along the guide rail 6 (FIG. 1). Free end 8a of the harness holding member 8 is rotated around the shaft 21a and located in front of the first case 5. The total length of an effective length of the guide rail 6 and a rotating length L along a horizontal direction almost corresponds to a stroke of the sliding door.

The wire harness 4 is folded into U-shape in the first case 5 so that the height of the first case 5 is reduced lower. The total length of the horizontal effective lengths of the guide rail 6 and harness holding member 8 gives the stroke of the sliding door so that the total length of the first case 5 can be shorter. The first case 5 can be miniaturized by cutting off with curved shape from the front end (the one side wall 13) to a folded portion 4b of the wire harness 4.

Figure 8:
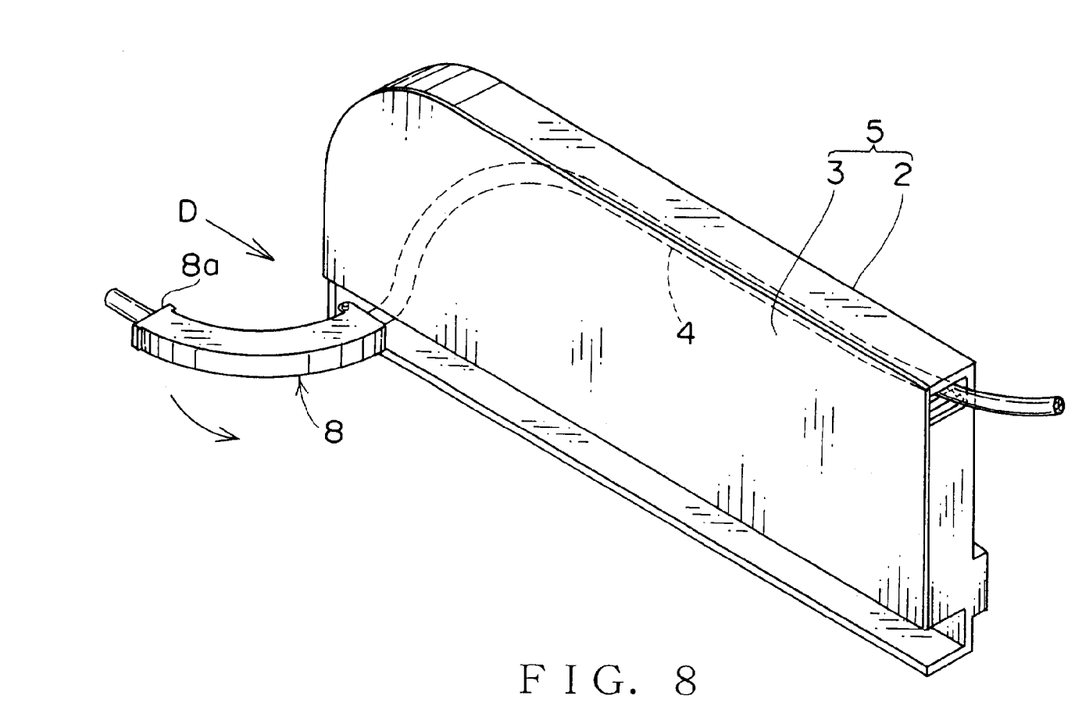
FIG. 8 is a perspective view of the power-supply wiring device in which the harness holding member is slid to the other side.
Figure 9:
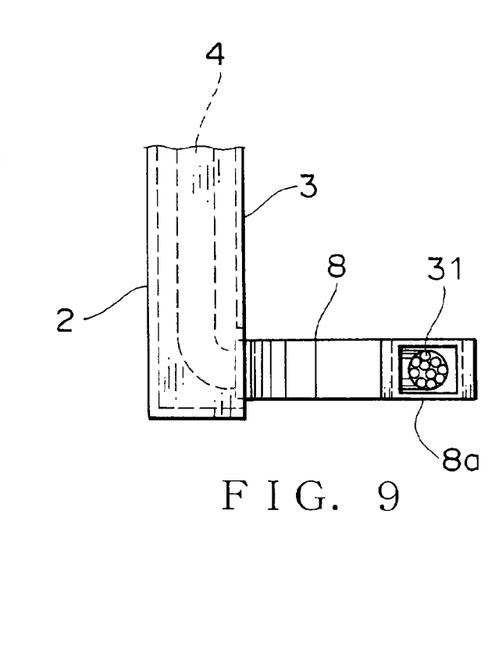
FIG. 9 is a side view of the power-supply wiring device, which is viewed from an arrow D in FIG. 8.

When the sliding door is moved from an open position in FIG. 6 toward the front side of the vehicle and closed, the harness holding member 8 is moved together with the slider 7 (FIG. 1) along the guide rail 6 to the rear side of the first case 5 and the free end 8a of the harness holding member 8 is rotated rearwardly around the shaft 21a and located at a rearward as shown in FIGS. 8 and 9. The wire harness 4 is deformed from a U-shape to a quadratic-like curved shape shown in FIG. 8. The wire harness 4 can follow a motion of the slider 7 in the first case 5 by elasticity-(restoring force) of the protect tube such as a corrugated tube.

The harness holding member 8 is located so as to cross over a space between the sliding door and the vehicle body like a bridge. The sliding door is moved from the full-open position shown in FIG. 6 along the vehicle body to the front side, and at a position just close to a complete close position shown in FIG. 8, the sliding door is moved to a direction close to the vehicle body (direction of crossing the vehicle body).

In the power-supply wiring device mentioned above, the harness holding member 8 can be formed into a U-shape, a semicircular shape or a flat plate shape instead of a rectangular shape in cross section, and the wire harness 4 is fixed at the middle of lengthwise of the harness holding member so as to prevent the wire harness 4 from sticking out of the harness holding member.

The fixing portion 15 (FIG. 1) can be projected outwardly, not inwardly, or can be disposed upwardly, or formed in various design. The guide rail 6 of the first case 5 can be disposed on the bottom wall 11 of the base portion 2. The slider 7 can be formed with a good-sliding synthetic resin instead of the rollers 18. In FIG. 2, by disposing the guide rail 6 at a lower position of the first case 5, the shaft 21a of the slider 7 can be straightly projected upwardly from the support portion 22 instead of bending the shaft 21a into a U-shape. The shaft 21a can be disposed on the harness holding member 8 and the bearing portion 24 can be disposed on the slider 7.

Since the sliding door is engaged slidably with a guide rail (not-shown) of the vehicle body, if the guide rail 6 of the first case 5 is not disposed, the slider 7 can be engaged slidably in the first case 5 by forming into a bent plate shape or a box shape instead of the embodiment in FIG. 1 so as not to be slipped out from the opening 30.

Figure 11:
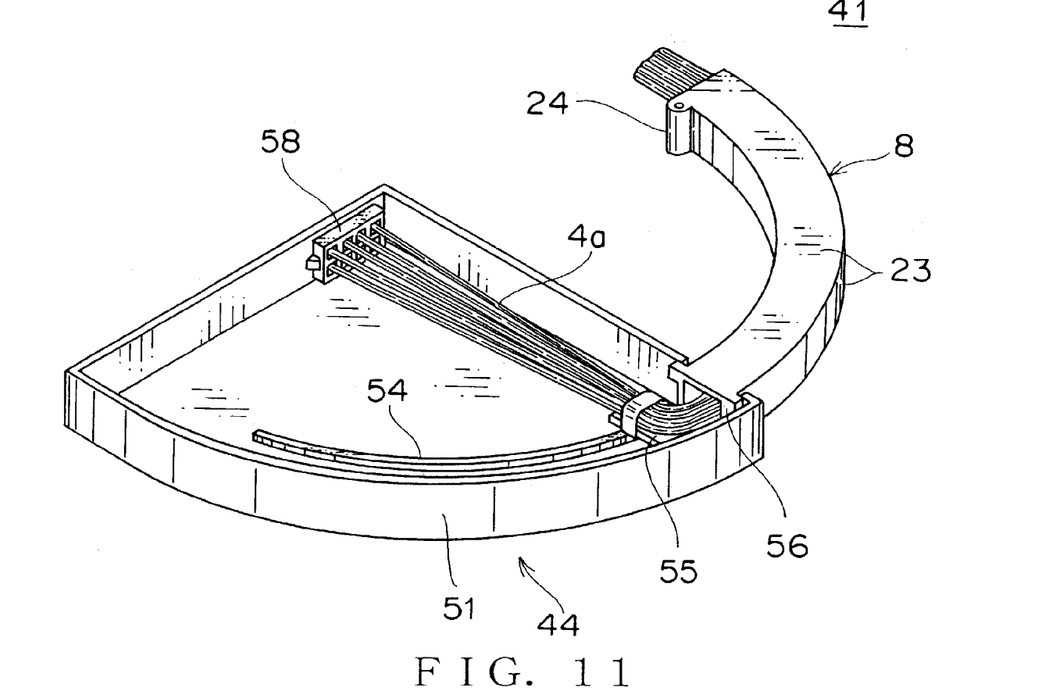
FIG. 11 is a perspective view of the power-supply wiring device at a fixed structure shown in FIG. 10.

The harness holding member 8 can be formed into a round shape or an oval shape, not limited into a rectangular shape, in a cross section. In the power-supply wiring device 1, the harness holding member 8 can be disposed directly on the vehicle body freely to be moved inwardly and outwardly, without a later-described second case on the vehicle body (FIG. 11). When there is enough horizontal room in the sliding door, the harness holding member 8 can be moved inwardly and outwardly in the sliding door and the first case 5 of the power-supply wiring device 1 is mounted in the vehicle body. The power-supply wiring device 1 can be applied not only for the sliding door of the vehicle but also the other sliding structure such as a sliding door of an apparatus or a sliding seat of the vehicle. The sliding structure and the first case 5 can be disposed horizontally and the harness holding member 8 can be disposed on the vertical fixed structure.

When the power-supply wiring device is applied for the sliding seat of the vehicle, the plate-shape harness holding member (not shown) disposed perpendicularly to the slider 7 may led from the opening 30 of the first case 5. The harness holding member may be formed integrally with the slider and the sliding seat is engaged slidably with a seat rail so that a guide rail of the first case can be eliminated. The first case 5 is preferably disposed horizontally on the sliding seat or a floor. The slit-shape opening 30 may be disposed upward or downward, and the harness holding member is led from the opening 30 toward the floor or the sliding seat.

FIGS. 11–15 show each embodiment of a power-supply wiring device at a vehicle body 47 (fixed structure) for absorbing a wire change by rotating motion of the harness holding member 8 while the sliding door 46 (sliding structure) is close to the vehicle body 47 for complete closing door and harness layout structure with the power-supply wiring device according to the present invention.

Figure 10:
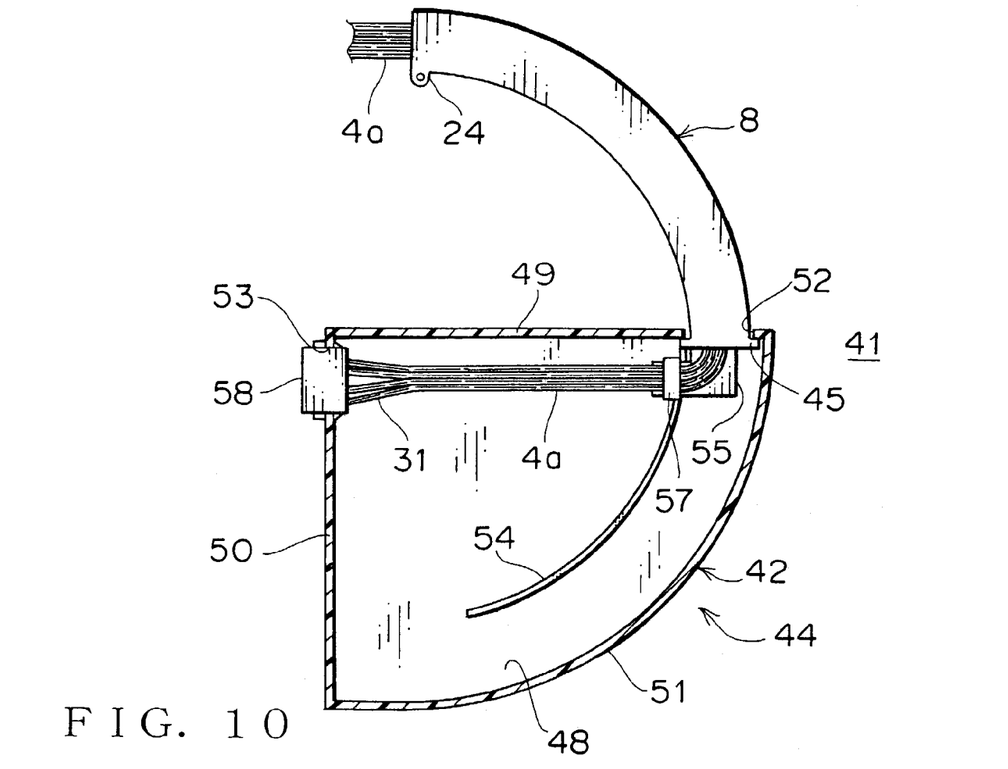
FIG. 10 is a plan view of one embodiment, in which a cover is removed, of a power-supply wiring device at a fixed structure according to the present invention.

A power-supply wiring device 41 in the vehicle body, as sown in FIGS. 10 and 11, has a flat sector-formed second case 44 (FIG. 14) made of synthetic resin and mounted horizontally on the vehicle body 47 for receiving the harness holding member 8 freely to be moved inwardly and outwardly. The harness holding member 8 formed into a circular arc tube having a rectangular section and made of synthetic resin is a connecting member of the first case 5 (FIG. 1) mounted on the sliding door.

The harness holding member 8 of the embodiment in FIG. 1 has the bearing portion 24 for rotating motion at the base end thereof and a projecting portion 45 projecting from the both sides at the free end thereof as a stopper against the second case 44. In the embodiment, the harness holding member 8 is formed into a quarter circular arc and the second case 44 is formed into a sector having an internal angle of 90 degree. An arc length of the harness holding member 8 or an internal angle of the second case 44 may be determined correspondingly to a distance between the sliding door and the vehicle body when the sliding door 46 is full-opened.

The harness holding member 8 is formed into a tube having rectangular cross-sectional to be enclosed by top, bottom, right and left of the wall portion 23 and has an inner space for inserting the wire harness 4a therethrough. The harness holding member 8 can be formed with a gutter portion having U-shape cross section and a flat cover connected rotatably by a hinge with the gutter portion to be engaged by a locking hook with an engaging portion of the gutter portion, similarly as a general harness protector.

Figure 14:
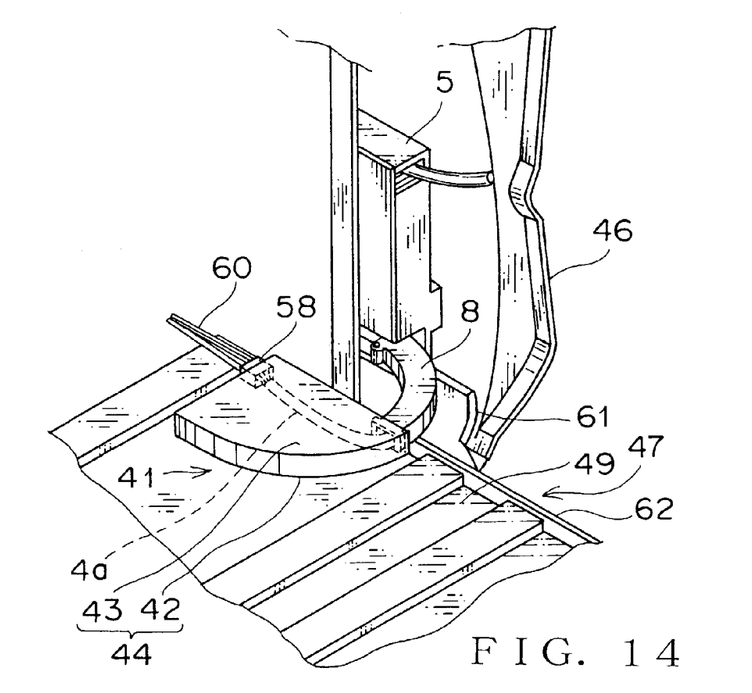
FIG. 14 is a perspective view of a harness layout structure with the power-supply wiring device according to the present invention, in which the power-supply wiring device is mounted in the sliding door and the vehicle body and the sliding door is fully opened.

The second case 44 includes a box-shape base portion 42 and a flat cover 43 (FIG. 14). The base portion 44 has a flat sector-formed base portion 48 and a surrounding wall formed with three walls 49, 50 and 51 rising from edges around the base portion 48. One flat wall 49 is provided close to an outer round side of the base portion 48 with one opening 52 for moving the harness holding member 8 inwardly and outwardly therethrough. The other flat wall 50 is provided close to a corner edge of the base portion 48 with the other opening 53 for connection or leading a wire harness. The height of the wall 49 is slightly larger than the height of the harness holding member 8. The harness holding member 8 is preferably formed as possible as flat. The height of vertical right and left walls 23 may be a half of the width of the top and bottom walls 23 or smaller.

A circular-shape wall 51 is continuous to a surround edge of the one opening 52 of the base portion 42. A circular guide rail 54 or a guide wall as a guide portion is risen from the base portion 48 along the circular-shape wall 51. The height of the guide rail 54 is pretty smaller (half or less) than the height of the surround wall 49–51. The harness holding member 8 is guided freely to be slid between the circular wall 51 and the guide rail 54. The circular wall 51 and the guide rail 54 are formed to have coaxial radius corresponding to the each radius of the harness holding member 8. The length of the guide rail 54 is smaller than that of the circular wall 51.

An L-shape harness guide plate 55 is provided at the front end of the harness holding member 8 so as to cross over the guide rail 54, and the wire harness 4a is led from an opening 56 at the front end of the harness holding member 8 along a top surface of the guide plate 55 so that interference between the wire harness 4a and the guide rail 54 is prevented. The wire harness (electric wires) 4a is fixed on the guide plate 55 by binding means 57 such as a band or a tape. The guide plate 55 is continuous to the bottom wall of the harness holding member 8 and bent upwardly into a step-like to cross over the guide rail 54. The guide plate 55 can be provided with a slide engage portion such as a groove corresponding to the guide rail 54.

The wire harness 4a extends substantially straight from the guide plate 55 toward the other opening 53 of the second case 44 and a connector 58 of the wire harness 4a is fixed in the other opening 53. The end of each electric wire 31 of the wire harness 4a is joined with a terminal and the each terminal is received in a connector housing made of synthetic resin to structure the connector 58. The connector 58 is fixed by a lock means such as a lock projection or an arm in the other opening 53. The connector 58 is connected with a not-shown wire harness of the vehicle body.

Figure 12:
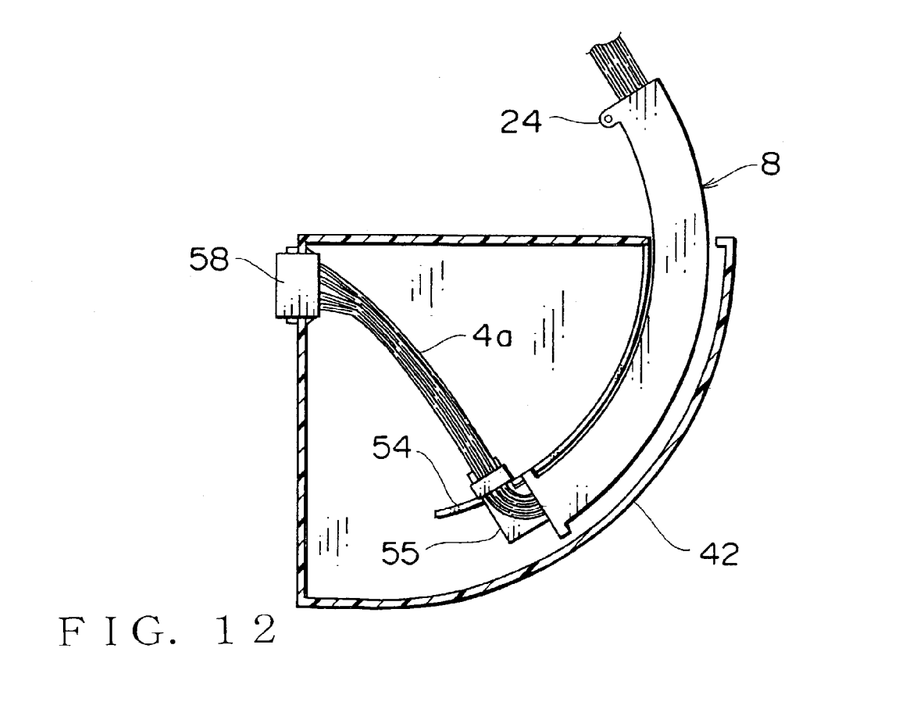
FIG. 12 is a plan view of the power-supply wiring device at a fixed structure shown in FIG. 10, in which the harness holding member is pushed inwardly.

When the harness holding member 8 is fully drawn as shown in FIG. 10, the projecting portion 45 abuts on an edge of the one opening 52 of the second case 44 to prevent the harness holding member 8 from slipping out of the second case 44. Pushing the harness holding member 8 from fully drawn condition in FIG. 10 into the second case 44 as shown in FIGS. 12 and 13, the harness holding member 8 is slid together with the wire harness 4a led from the front opening 56 along the guide rail 54 to make a circular track.

Figure 13:
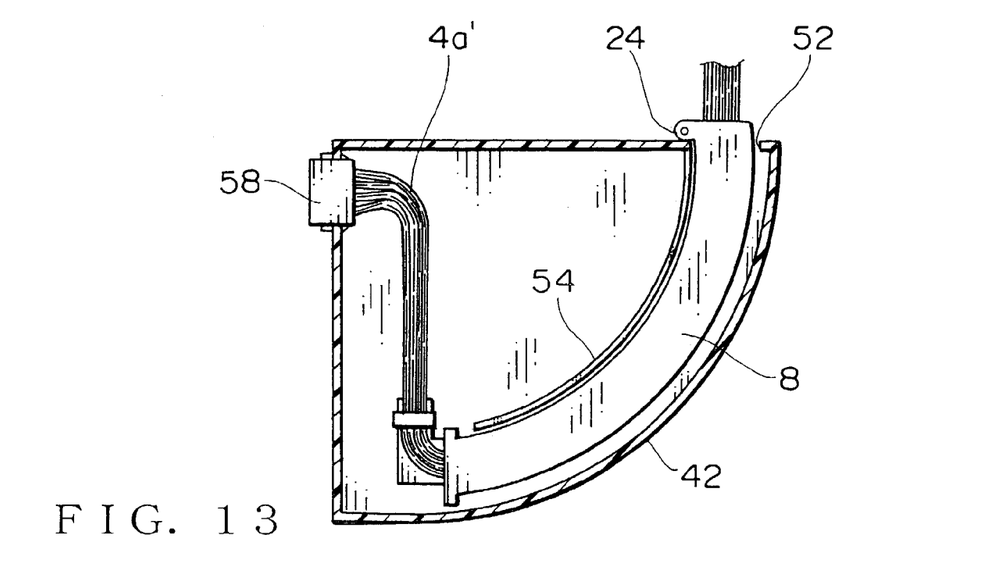
FIG. 13 is a plan view of the power-supply wiring device at a fixed structure shown in FIG. 10, in which the harness holding member is pushed completely into inside.

The wire harness 4a swings between positions in FIG. 10 and 13 to maintain almost straight form in the second case 44. In FIG. 13, the wire harness 4a is bent at a harness portion 4a' near the connector 58 toward a right angle direction. When the harness holding member 8 is fully pushed in the second case 44, the bearing portion 24 at the base end of the harness holding member 8 abuts on the edge of the one opening 52 so that the harness holding member 8 is prevented to be pushed in furthermore. Thus, the bearing portion 24 performs as a stopper. A projection for a stopper may be provided at an opposite side against the bearing portion 24.

FIG. 14 shows that a left sliding door 46 of the vehicle is pulled toward a rear side of the vehicle so as to be fully opened, correspondingly to FIG. 10 showing the harness holding member 8 to be fully drawn. The first case 5 of the power-supply wiring device 1 shown in FIG. 1 is disposed vertically in the sliding door 46, for example between a door panel and a door trim. The harness holding member 8 crosses between the sliding door 46 and the vehicle body 47 so as to extend horizontally and curvedly from the vertical first case 5 to the horizontal second case 44.

The second case 44 is disposed horizontally on the floor 49 of the vehicle body. The second case 44 is flat to be also applied for the vehicle body 47 without a step of a passenger car instead of a one-box type car. In FIG. 14, marking 60 shows a wire harness in the vehicle body, and marking 61 shows a lower arm for guiding slide motion of the sliding door 46, and marking 62 shows a weather strip for water protect.

Figure 15:
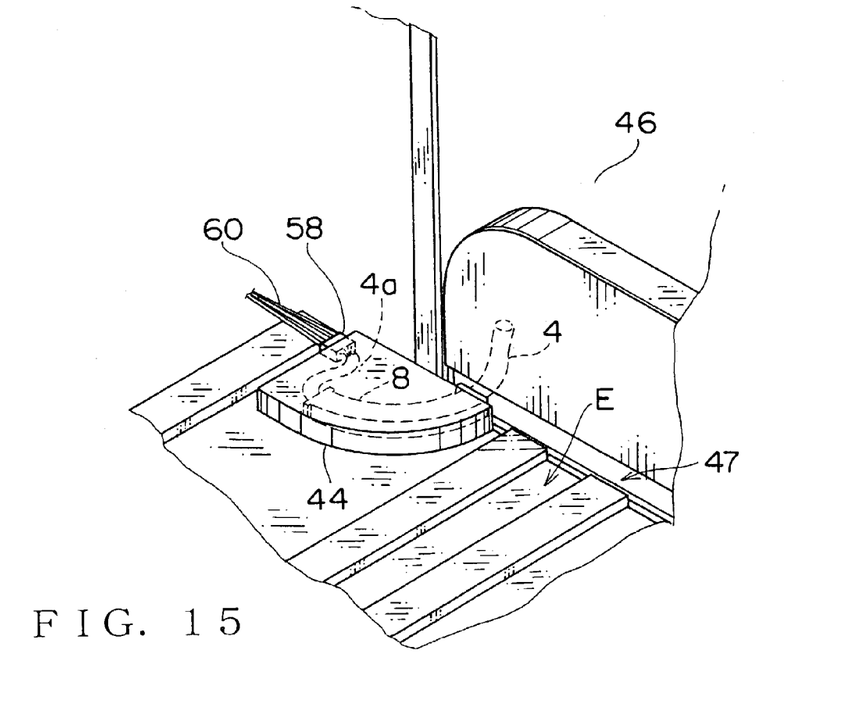
FIG. 15 is a perspective view of the harness layout structure with the power-supply wiring device shown in FIG. 14, in which the sliding door is fully closed.

By moving the sliding door 46 from the full-open position shown in FIG. 14 to the front side of the vehicle body, the sliding door 46 is located at a complete close position shown in FIG. 15. FIG. 15 correspond to FIG. 13 and the sliding door 46 is moved to a direction close to the vehicle body 47 shown by an arrow E (direction toward a cabin of the vehicle) at a position just close to a complete close position. Thereby, the harness holding member 8 is pushed along a circular track into the second case 44 to absorb smoothly a wire length change by motion of the sliding door 46 toward the cabin.

In the power-supply wiring device shown in FIGS. 10–15, the sector-formed second case 44 may have an internal angle of not only 90 degrees, but also an adjusted degree corresponding to a different stroke of the harness holding member 8 depending on each car model. If the second case 44 and the harness holding member 8 correspond to a larger stroke for room, one type of the second case 44 and the harness holding member 8 can be commonly used for each car model. The second case 44 may be formed into not only a sector but also a rectangular (however, more space for mounting is required). The harness holding member 8 may be formed into not only a quarter circular arc but also a different circular arc having a various radius and a length.

The guide rail 54 (FIG. 11) can be disposed on the base portion 42 of the second case 44 and/or the cover 43. Providing a guide groove on the top wall and/or the bottom wall of the harness holding member 8, a low profile circular guide rail engaging slidably with the guide groove can be disposed on the second case 44. Conversely, providing this guide groove on the second case 44, the guide rail can be provided on the harness holding member 8. Thereby, there is no interference between the guide rail 54 and the wire harness 4a so that the harness guide plate 55 is not required. In this case, a projecting portion for fixing the wire harness 4a with a tape is preferably provided at an edge of the opening of the harness holding member 8. The harness holding member 8 can be formed into not only a circular arc but also an L-shape, a trapezoid bent shape or a straight shape. The harness holding member 8 having such different shape requires more space in the second case 44 and may be moved not so smoothly.

The harness holding member 8 can be structured to move slidably with rollers as the slider 7 in FIG. 1. Not providing the connector 58 on the second case 44, and leading the wire harness 4a to outside from the other opening 53 of the second case, the wire harness 4a can be connected by a connector with the wire harness 60 in the vehicle body at outside of the second case 44.

While the forms of the invention herein disclosed constitute presently preferred embodiments, many others are possible. It is not intended herein to mention all the possible embodiments of the invention which will be apparent to those skilled in the art. It is understood that the term used herein are merely descriptive rather than limiting, in that various changes may be made without departing from the scope of this invention as defined by the following claims.

What is claimed is:

1. A power-supply wiring device comprising:
   a first case mounted on a sliding structure capable to receive a wire harness folded into a U-shape;
   a second case mounted in a fixed structure;
   a moving portion movable freely along said first case; and
   a harness holding member mounted on said moving portion for holding said wire harness and leading said wire harness out of said first case,
   wherein the second case receives the harness holding member and which allows the harness holding member to swing freely in and out of the second case,
   wherein harness holding member connects the first case and the second case.

2. The power-supply wiring device according to claim 1, wherein a first guide portion for sliding freely said moving portion to be engaged with said first guide portion is disposed along lengthwise of said first case.

3. The power-supply wiring device according to claim 1 or 2, wherein said harness holding member is engaged rotatably around one end thereof with a shaft of said moving portion, further comprising a second case receiving said harness holding member to be moved inwardly and outwardly for supporting said wire harness led out of the other end of said harness holding member freely to swing said wire harness.

4. The power-supply wiring device according to claim 3, wherein said second case is provided with a second guide portion for sliding said harness holding member.

5. The power-supply wiring device according to claim 3, wherein said harness holding member is moved along a circular arc inwardly and outwardly in said second case.

6. The power-supply wiring device according to claim 3, wherein said harness holding member is formed into a circular arc shape.

7. The power-supply wiring device according to claim 3, wherein said harness holding member is provided with a space for passing said wire harness there through.

8. The power-supply wiring device according to claim 3, wherein a connector at an end of said wire harness is fixed on said second case.

9. A harness layout structure by said power-supply wiring device according to claim 3, wherein said first case of the power-supply wiring device is mounted on a sliding structure and said second case of the power-supply wiring device is mounted on a fixed structure engaging with said sliding structure freely to slide to each other, wherein said harness holding member is disposed rotatably and slidably at said sliding structure, wherein said wire harness is wired from said sliding structure through said harness holding member into said second case on said fixed structure.

10. The harness layout structure according to claim 9, wherein said sliding structure is disposed vertically, and said fixed structure and said harness holding member are disposed horizontally.

* * * * *